UNITED STATES PATENT OFFICE 2,410,911

PROCESS OF PREPARING A LUBRICATING OIL SOLUTION OF A CONDENSED ORGANIC AMINO COMPOUND

Jones I. Wasson, Union, N. J., and Warren M. Smith, Baton Rouge, La., assignors to Standard Oil Development Company, a corporation of Delaware No Drawing. Application December 22, 1943, Serial No. 515,288

3 Claims. (Cl. 252—51.5)

This invention relates to the preparation of amino compounds derived from alkylated phenols by the introduction of an amino group into a side chain of such phenols and causing autocondensation of the product to form a resinous oil-soluble composition.

The organic compositions herein described are particularly useful as additives for mineral lubricating oils, particularly those, such as gear lubricants, which contain chlorine in a form which is hydrolyzable in the presence of water. The new additive serves to absorb the hydrogen chloride produced, thus preventing corrosion of metal surfaces. The amine hydrochloride which is formed does not precipitate from the oil as is so often the case when other amines, such as amylamine, aniline, triethanolamine and the like, are used for this purpose.

Typical products are obtained in accordance with the present invention, by reacting formaldehyde and ammonia with a phenol having an alkyl side chain of at least five carbon atoms, and then heating the product for a period of several hours to cause autocondensation of the reaction product with the elimination of a substantial amount of nitrogen. Other nitrogen bases, such as the aliphatic and aromatic amines, may be used in place of ammonia; or hexamethylenetetramine, a reaction product of formaldehyde and ammonia, may be reacted with the phenol. If desired, the products after undergoing autocondensation may be reacted with metallic bases to form salts of the resinous compounds; such salts are likewise useful addition agents for mineral lubricating oils. The solubility of these products in hydrocarbon oils varies with the degree of condensation or resinification of the reaction products, the simplest product of reaction often being very slightly soluble. Their solubility and effectiveness are readily increased by subjecting them to autocondensation conditions during their preparation, or by subjecting the simple reaction products to condensation treatment after they have been prepared. The increase in the oil solubility of these products is also desirable in that it makes possible the preparation of liquid concentrates containing relatively large proportions, such as 25% or more, of the improving agents of this invention dissolved in a hydrocarbon oil, this concentrated solution being conveniently used for blending purposes. It may be noted that the oil solubility of the products also increases with the length of the alkyl substituent in the aromatic nucleus.

The products of the present invention differ materially from the hard Bakelite type resin produced from phenol and its low molecular weight homologs. When using a phenol with a side chain of at least five carbon atoms, the condensation with the aldehyde and nitrogen base is not so drastic as to produce a hard resin, and the product is correspondingly more soluble in mineral oils.

The class of compounds which may be advantageously prepared by the method of the present invention and condensed to form oil-soluble compositions may be defined broadly as those which possess the characterizing structure

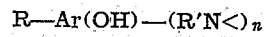

in which Ar is an aromatic nucleus, R is an alkyl group of at least five carbon atoms, R' is an alkyl linkage such as

in which R'' represents either hydrogen or an alkyl or aryl group and may represent similar or different groups in the same molecule, and $n$ is a small whole number. Various substituent radicals may be attached at many positions in the aryl nucleus and may be ortho, meta and/or para to the hydroxyl group and to each other. Especially useful are the resinous condensation products of materials having the characterizing structure

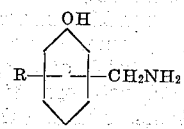

in which R is an alkyl group of at least five carbon atoms.

The hydroxylarylalkyl amine compounds described above may be prepared in accordance with the present invention by reacting together an alkylated hydroxyaryl compound, such as an alkylated phenol, with an aldehyde and a nitrogen base, or with hexamethylenetetramine, preferably by heating under pressure. The reaction may be carried out in an aqueous medium if desired, or in the presence of an organic solvent such as absolute ethyl alcohol or isopropyl alcohol, or hydrocarbon solvents, such as benzene, xylene or lubricating oils. If ammonia is the nitrogen base used, and if the aldehyde is formaldehyde, it is convenient to react the phenol with a concentrated aqueous formaldehyde solution and a concentrated aqueous solution of ammonia. Generally the temperatures required to bring about the reaction are of the order of 110° C. or higher. The reactants may be employed in any relatively equivalent molar proportions, but it is preferred to use from 1½ to 2½ mols of aldehyde and from 1 to 3 mols of the nitrogen base for each mol of the phenolic material present.

In the preparation of the hydroxyarylalkyl amines the alkyl phenol radical becomes united with the base radical through the methylene (—CH$_2$—) group, thereby forming compounds containing the following characteristic group:

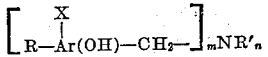

wherein, as before, R—Ar(OH)— represents the alkyl phenol group, X represents hydrogen or an organic group, and the nitrogen atom N has valencies which may be satisfied by hydrogen or organic radicals (R'), which may represent an alkyl, cycloalkyl, aryl or hydroxyalkyl benzyl radical, and which may represent similar or different radicals in the molecule, $m$ is an integer from 1 to 3, and $n$ is 0, 1 or 2. The following are illustrative of the various types of compounds which may be employed:

R—(X)Ar(OH)—CH$_2$—NH$_2$

[R—(X)Ar(OH)—CH$_2$—]$_2$NH

[R—(X)Ar(OH)—CH$_2$—]$_3$N

R—(X)Ar(OH)—CH$_2$—N(R')$_2$

[R—(X)Ar(OH)—CH$_2$—]$_2$NR'

The nitrogen base which may be used in the process of the present invention is preferably ammonia, and next in order of preference come the aliphatic and aromatic amines, primary, secondary. Specific amines which may be considered preferable are, for illustration, diamylamine, monoamylamine, monocyclohexylamine, dicyclohexylamine, monomethylaniline and the like. Formaldehyde is the preferred aldehyde, the polymerized forms of formaldehyde such as paraformaldehyde or trioxymethylene may also be used. Other aliphatic aldehydes, such as acetaldehyde, propionaldehyde, etc., may likewise be employed.

The hydroxy aromatic compounds used in the present process include generally all nuclearly hydroxylated compounds having phenolic properties and a readily replaceable nuclear hydrogen atom which is preferably meta or ortho to the hydroxyl group. Suitable examples of such compounds are the alkyl phenols prepared by the alkylation of phenols with olefins, including mixtures of olefins such as those obtained in cracked petroleum fractions, and by the alkylation of phenols with alkyl halides, including chlorinated paraffin waxes and chlorinated petrolatums derived from petroleum. Such chlorinated waxes may contain dichlorides and polychlorides and may be used in alkylating phenols by the customary Friedel-Crafts type of synthesis to give alkylated phenols of high molecular weight in which several phenol groups are linked by alkyl radicals in a single molecule. These high molecular weight complex alkyl phenolic products, when reacted with an aldehyde and a nitrogen base as described herein, give products which are effective in reducing the pour point of waxy oils and in raising the viscosity index of lubricating oils as well as in improving their lubricating properties, such as film strength, and their stability and resistance to oxidation.

In addition to the phenols, other hydroxy aromatic compounds may be employed in forming the hydroxyarylalkyl amines. For example, alkylated phenol sulfides and disulfides may be employed. These may be reacted with formaldehyde and ammonia or other nitrogen bases to form products of the type

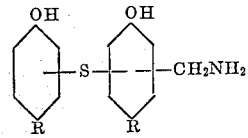

or

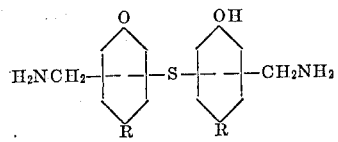

in which R is preferably an alkyl radical. These products may be caused to undergo autocondensation.

Other hydroxy aromatic compounds which may be used in accordance with the present invention include such compounds as alkylated naphthols, alkylated hydroxy biphenyl, etc.

The autocondensation of the hydroxyaryl amino compounds described above may be accomplished by heating. The extent of heating required varies with the composition of the particular compound being treated, some needing only four to six hours, while other require fifteen to twenty hours of heating at a temperature of 110° to 120° C. (230–250° F.). In some cases the heating time is shortened by using higher temperatures. The condensation of amines may be brought about not only by heating, but by standing at room temperature for a long period of time. Heating greatly hastens the autocondensation of the product, however. It may be carried out at atmospheric pressure or at higher pressures. It is often convenient to seal the compound in a bomb and conduct the process at the pressure developed at 110° to 120° C. Whether the condensation is caused by heating or long standing, a characteristic change in the product is the elimination of substantial amounts of nitrogen, the amounts eliminated ranging from 10% to 75% of the original nitrogen content, depending upon conditions.

Since formaldehyde and ammonia react together readily to form hexamethylenetetramine, it may be assumed that in all cases where formaldehyde and ammonia are used in the process hexamethylenetetramine is first formed and in turn reacts with the phenolic compound. It is therefore a variation of the process of the present invention to employ hexamethylenetetramine in cases where a mixture of ammonia and formaldehyde would be used to prepare the desired product. A suitable solvent, such as absolute ethyl alcohol, benzene, xylene or lubricating oil, may be used to aid the reaction. Such a solvent is particularly useful when the phenol to be reacted is a solid. No pressure is required, and the reaction may be carried in a simple steel reaction vessel.

The process of the present invention may be illustrated by the following examples.

*Example 1*

A stainless steel bomb was charged with 51.5 grams of p-tert.-octylphenol. Then 20 grams of 37% strength aqueous formaldehyde and 25 cc. of concentrated aqueous ammonia were added and the bomb was quickly sealed. The bomb was heated to 120° C. and held at this temperature for 16 hours, after which it was cooled and opened and the reaction mixture poured into water. The product was extracted with ether, and the ether extract was washed free of ammonia and subsequently dried over sodium sulfate. After the ether was removed by evaporation, there remained 50.5 grams of a soft red resin which contained 1.3% of nitrogen.

*Example 2*

A stainless steel bomb was charged with 150 cc. of absolute ethyl alcohol and 7.5 grams of trioxymethylene. The solution was then saturated with ammonia gas at 0° C., the trioxymethylene being dissolved during the process of saturation. 17.5 grams of ammonia were absorbed. 55.5 grams of tert.-octylphenol were then added, and the bomb was quickly closed and heated at 110° C. for 20 hours. The bomb was then cooled, opened, and the reaction mixture poured into water and extracted with ether. The ether extract was washed free of ammonia with water and then dried over sodium sulfate. Evaporation of the ether yielded 62 grams of a soft light colored resin, which upon analysis was found to contain 2.52% of nitrogen. Upon heating this material at 200° C. for one-half hour under 3 mm. absolute pressure and then cooling, a brittle resin was obtained which had a nitrogen content of 0.56%. A portion of this material was then blended in 0.1% concentration with a turbine oil which normally caused heavy corrosion in a turbine oil corrosion test. The blend showed only very slight corrosion in this test, and in fact this additive was found to be substantially as effective as the best anti-corrodants now known.

*Example 3*

410 lbs. of diamylphenol (1.8 mols) and 50 lbs. of hexamethylenetetramine (0.4 mol) were charged into a steel reaction tank fitted with steam coils. The mixture was heated by gradually raising the pressure in the steam coils. At about 200° F. (93° C.) the reaction began. After further gradual heating to about 300° F. (149° C.) over a period of 3½ hrs. a product was formed which, on cooling, was an amber colored resinous material readily soluble in mineral lubricating oil and containing about 3.4% of nitrogen.

It is not intended that the invention be limited by any of the particular examples, which have been presented only for the purpose of illustration, but solely by the terms of the appended claims.

We claim:

1. The process of preparing a lubricating oil solution of a resin which comprises reacting a phenol containing an alkyl side chain of five to eight carbon atoms and at least one replaceable hydrogen atom in its nucleus with hexamethylenetetramine in the presence of a solvent consisting essentially of a mineral oil of the lubricating oil range at a temperature of about 110° to about 150° C. for a period of about 4 to about 20 hours until about 10 to about 75% of the original nitrogen content of the reactants is eliminated.

2. Process according to claim 1 in which the phenol is an octyl phenol.

3. Process according to claim 1 in which the phenol is p-tert.-octylphenol.

JONES I. WASSON.
WARREN M. SMITH.